US012666500B2

(12) United States Patent　　　　(10) Patent No.:　US 12,666,500 B2
Suh　　　　　　　　　　　　　　　(45) Date of Patent:　Jun. 23, 2026

(54) METHOD AND APPARATUS FOR CONTROLLING NETWORK SLICE IN WIRELESS COMMUNICATION SYSTEM

(71) Applicant: Samsung Electronics Co., Ltd., Gyeonggi-do (KR)

(72) Inventor: Dongeun Suh, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 247 days.

(21) Appl. No.: 18/498,534

(22) Filed: Oct. 31, 2023

(65) Prior Publication Data

US 2024/0147575 A1　　May 2, 2024

(30) Foreign Application Priority Data

Nov. 1, 2022　(KR) ......................... 10-2022-0143412

(51) Int. Cl.
　　*H04W 76/34*　　(2018.01)
　　*H04W 48/14*　　(2009.01)
　　*H04W 76/10*　　(2018.01)
(52) U.S. Cl.
　　CPC ........... *H04W 76/34* (2018.02); *H04W 48/14* (2013.01); *H04W 76/10* (2018.02)
(58) Field of Classification Search
　　CPC ..... H04W 76/34; H04W 48/14; H04W 76/10; H04W 48/18; H04W 60/00; H04W 76/12; H04L 41/0803

(Continued)

(56) References Cited

U.S. PATENT DOCUMENTS

2022/0264439 A1* 8/2022 Ianev ...................... H04L 41/40
2022/0361093 A1* 11/2022 Kiss ...................... H04W 24/02
2025/0261098 A1* 8/2025 Kuge .................... H04W 48/18

FOREIGN PATENT DOCUMENTS

EP　　　　4 090 060　　　11/2022
KR　　10-2021-0144556　　11/2021

(Continued)

OTHER PUBLICATIONS

3GPP TS 23.502 V17.6.0, 3rd Generation Partnership Project; Technical Specification Group Services and System Aspects; Procedures for the 5G System (5GS); Stage 2 (Release 17), Sep. 2022, 748 pages.

(Continued)

*Primary Examiner* — Rownak Islam
(74) *Attorney, Agent, or Firm* — The Farrell Law Firm, P.C.

(57)　　　　　　ABSTRACT

The disclosure relates to a fifth generation (5G) or sixth generation (6G) communication system for supporting a higher data transmission rate. A method a network entity in a wireless communication system includes determining whether to transmit an update request message for a number of at least one user equipment (UE) with at least one packet data unit (PDU) session or packet data network (PDN) connection established on a network slice, based on the at least one PDU session or PDN connection established on the network slice, transmitting the update request message to a network slice admission control function (NSACF) entity, and receiving, from the NSACF entity, an update response message indicating whether the number of the at least one UE with the at least one PDU session or PDN connection established on the network slice reaches a maximum number of registered UEs with the network slice.

16 Claims, 8 Drawing Sheets

(58) Field of Classification Search
USPC .......................................................... 370/328
See application file for complete search history.

(56) References Cited

FOREIGN PATENT DOCUMENTS

| WO | WO 2022/180617 | 9/2022 |
| WO | WO 2022/211424 | 10/2022 |
| WO | WO 2023/286778 | 5/2024 |

OTHER PUBLICATIONS

ZTE, "KI#1KI#2—NSACF Service Operation Name Update", S2-2105744, 3GPP TSG SA WG2 Meeting #146E, Aug. 16-27, 2021, 8 pages.
3GPP TS 29.536 V17.2.0, 3rd Generation Partnership Project; Technical Specification Group Core Network and Terminals; 5G System; Network Slice Admission Control Services; Stage 3 (Release 17), Sep. 2022, 63 pages.
ZTE, "NumOfUEsPerSlice—Data Structure Update", C4-214108, 3GPP TSG-CT WG4 Meeting #105-e, Aug. 17-27, 2021, 9 pages.
International Search Report dated Jan. 26, 2024 issued in counterpart application No. PCT/KR2023/016779, 8 pages.
ZTE, "Per Access Type NSAC for No. of PDU Sessions", C4-220089, 3GPP TSG-CT WG4 Meeting #107-bis-e, Jan. 17-21, 2022, 4 pages.
European Search Report dated Dec. 4, 2025 issued in counterpart application No. 23886138.9-1206, 12 pages.

* cited by examiner 220                                                                  230

210                                                                  230

800

900

METHOD AND APPARATUS FOR CONTROLLING NETWORK SLICE IN WIRELESS COMMUNICATION SYSTEM

CROSS-REFERENCE TO RELATED APPLICATION(S)

This application is based on and claims priority under 35 U.S.C. § 119 to Korean Patent Application No. 10-2022-0143412, filed on Nov. 1, 2022, in the Korean Intellectual Property Office, the disclosure of which is incorporated herein by reference in its entirety.

BACKGROUND

1. Field

The disclosure relates generally to a method and apparatus for controlling a network slice in a wireless communication system, and more specifically, to a method and apparatus for managing a network slice quota based on the number of user equipments (UEs) which actually use data in the wireless communication system.

2. Description of Related Art

Fifth generation (5G) mobile communication technologies define broad frequency bands such that high transmission rates and new services are possible and can be implemented not only in sub 6 gigahertz (GHz) bands such as 3.5 GHz, but also in above 6 GHz bands referred to as millimeter wave (mmWave) bands including 28 GHz and 39 GHz. In addition, it has been considered to implement sixth generation (6G) mobile communication technologies (referred to as beyond 5G systems) in terahertz (THz) bands, 95 GHz to 3 THz bands, to accomplish transmission rates fifty times faster than 5G mobile communication technologies and ultra-low latencies one-tenth of 5G mobile communication technologies.

When the development of 5G mobile communication technologies began, to support services and to satisfy performance requirements in connection with enhanced mobile broadband (eMBB), ultra reliable low latency communications (URLLC), and massive machine-type communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of a bandwidth part (BWP), new channel coding methods such as a low density parity check (LDPC) code for large amount of data transmission and a polar code for highly reliable transmission of control information, L2 pre-processing, and network slicing for providing a dedicated network specialized to a specific service.

Discussions persist regarding improvement and performance enhancement of initial 5G mobile communication technologies in view of services to be supported by 5G mobile communication technologies, and there has been physical layer standardization regarding technologies such as vehicle-to-everything (V2X) for aiding driving determination by autonomous vehicles based on information regarding positions and states of vehicles transmitted by the vehicles and for enhancing user convenience, new radio unlicensed (NR-U) aimed at system operations conforming to various regulation-related requirements in unlicensed bands, NR UE power saving, non-terrestrial network (NTN) which is UE-satellite direct communication for providing coverage in an area in which communication with terrestrial networks is unavailable, and positioning.

Moreover, there has been ongoing standardization in air interface architecture/protocol regarding technologies such as the industrial Internet of things (IIoT) for supporting new services through interworking and convergence with other industries, integrated access and backhaul (IAB) for providing a node for network service area expansion by supporting a wireless backhaul link and an access link in an integrated manner, mobility enhancement including conditional handover and dual active protocol stack (DAPS) handover, and two-step random access for simplifying random access procedures (2-step RACH for NR). There also has been ongoing standardization in system architecture/service regarding a 5G service based architecture or interface for combining network functions virtualization (NFV) and software-defined networking (SDN) technologies, and mobile edge computing (MEC) for receiving services based on UE positions.

As 5G mobile communication systems are commercialized, connected devices that have been exponentially increasing will be connected to communication networks. Thus, it is anticipated that enhanced functions and performances of 5G mobile communication systems and integrated operations of connected devices will be necessary. To this end, new research is scheduled in connection with extended reality (XR) for efficiently supporting augmented reality (AR), virtual reality (VR), mixed reality (MR) and the like, 5G performance improvement and complexity reduction by utilizing artificial intelligence (AI), machine learning (ML), AI service support, metaverse service support, and drone communication.

Such development of 5G mobile communication systems will serve as a basis for developing not only new waveforms for providing coverage in terahertz bands of 6G mobile communication technologies, multi-antenna transmission technologies such as full dimensional multiple input multiple output (FD-MIMO), array antennas and large-scale antennas, metamaterial-based lenses and antennas for improving coverage of THz band signals, high-dimensional space multiplexing technology using orbital angular momentum (OAM), and reconfigurable intelligent surface (RIS), but also full-duplex technology for increasing frequency efficiency of 6G mobile communication technologies and improving system networks, AI-based communication technology for implementing system optimization by utilizing satellites and AI from the design stage and internalizing end-to-end AI support functions, and next-generation distributed computing technology for implementing services at levels of complexity exceeding the limit of UE operation capability by utilizing ultra-high-performance communication and computing resources.

Conventionally, a network slice quota management method is a scheme of counting the number of UEs registered with any network slice to control the number of UEs to be less than a predetermined maximum number of registered UEs for a S-NSSAI. However, there may be a UE (hereinafter, an inactive UE) which is registered with a slice but does not transmit user data to a data plane. Thus, the conventional network slice quota control scheme based on a maximum number of registered UEs may be inefficient at utilization of resources of the slice if a plurality of inactive UEs occupy a quota.

Therefore, there is a need in the art for a network slice quota management method that considers UEs having an actual session, to enhance the efficiency of the network slice control scheme.

SUMMARY

The disclosure has been made to address at least the above-mentioned problems and/or disadvantages and to provide at least the advantages described below.

Accordingly, an aspect of the disclosure is to provide a network slice quota management method based on the number of UEs which actually use data and have a session, to improve a network slice resource utilization rate in the network slice quota management method.

Another aspect of the disclosure is to provide a control method to control the number of active UEs which are registered for any network slice and have at least one session exceeding a maximum number of registered UEs with at least one packet data unit (PDU) session for a S-NSSAI of UEs set for the corresponding slice.

In accordance with an aspect of the disclosure, a method of a network entity in a wireless communication system may include determining whether to transmit an update request message for a number of at least one UE with at least one PDU session or packet data network (PDN) connection established on a network slice based on the at least one PDU session or PDN connection established on the network slice, transmitting the update request message to a network slice admission control function (NSACF) entity, and receiving, from the NSACF entity, an update response message indicating whether the number of the at least one UE with the at least one PDU session or PDN connection established on the network slice reaches a maximum number of registered UEs with the network slice.

In accordance with an aspect of the disclosure, a method of an NSACF entity in a wireless communication system may include receiving, from a network entity, an update request message for a number of at least one UE with at least one PDU session or PDN connection established on a network slice based on the at least one PDU session or PDN connection established on the network slice, and transmitting, to the network entity, an update response message indicating whether the number of the at least one UE with the at least one PDU session or PDN connection established on the network slice reaches a maximum number of registered UEs with the network slice.

In accordance with an aspect of the disclosure, a network entity in a wireless communication system may include a transceiver, and at least one processor coupled to the transceiver and configured to determine whether to transmit an update request message for a number of at least one UE with at least one PDU session or PDN connection established on a network slice based on the at least one PDU session or PDN connection established on the network slice, transmit the update request message to an NSACF entity, and receive, from the NSACF entity, an update response message indicating whether the number of the at least one UE with the at least one PDU session or PDN connection established on the network slice reaches a maximum number of registered UEs with the network slice.

In accordance with an aspect of the disclosure, an NSACF entity in a wireless communication system may include a transceiver, and at least one processor coupled to the transceiver and configured to receive, from a network entity, an update request message for a number of at least one UE with at least one PDU session or PDN connection established on a network slice based on the at least one PDU session or PDN connection established on the network slice, and transmit, to the network entity, an update response message indicating whether the number of the at least one UE with the at least one PDU session or PDN connection established on the network slice reaches a maximum number of registered UEs with the network slice.

BRIEF DESCRIPTION OF THE DRAWINGS

The foregoing and other aspects, features and advantages of certain embodiments of the present disclosure will become more apparent from the following description with reference to the accompanying drawings, in which.

DETAILED DESCRIPTION

Figure 1:
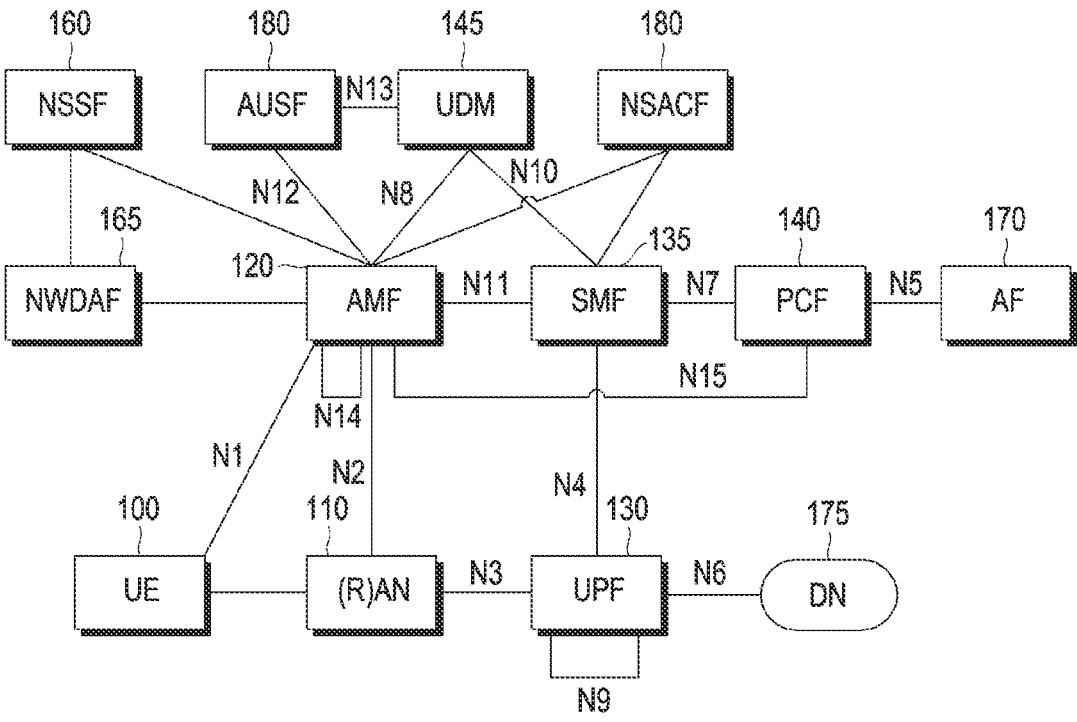
FIG. 1 illustrates a 5G system architecture to which the disclosure is applied.

The following description with reference to the accompanying drawings is provided to assist in a comprehensive understanding of embodiments of the present disclosure. Accordingly, those of ordinary skill in the art will recognize that various changes and modifications of the embodiments described herein can be made without departing from the scope and spirit of the present disclosure. Descriptions of well-known functions and constructions may be omitted for the sake of clarity and conciseness.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

FIG. 1 illustrates a 5G system architecture to which the disclosure is applied.

A 5G mobile communication network may include a UE (e.g., a terminal) 100, a 5G RAN 110 (e.g., a base station, a gNB (5g nodeB), an evolved nodeB (eNB), and/or the like), and a 5G a core network. Here, a UE may be also referred to as a terminal. The 5G core network may include network function (NF) entities such as an access and mobility management function (AMF) 120 which provides a mobility management function for a UE, a session management function (SMF) 135 which provides a session management function, a user plane function (UPF) 130 which performs a data delivery role, a policy control function (PCF) 140 which provides a policy control function, a unified data management (UDM) 145 which provides a data management function for subscriber data, policy control data, etc., a unified data repository (UDR) which stores data of various network functions (NFs) such as the UDM 145, etc., a network slice admission control function (NSACF) 180, and a network repository function (NRF). Further, The 5G core network may include network function (NF) entities such as a network slicing selection function (NSSF) 160, a network data analytics function (NWDAF) 165, application function (AF) 170, data network (DN) 175, and authentication server function (AUSF) 180 etc.

In a communication system, a conceptual link connecting NFs in the 5G system is defined as a reference point. The following illustrates reference points included in a 5G system architecture shown in FIG. 1.

N1: Reference point between a UE and an AMF
N2: Reference point between a (R)AN and an AMF
N3: Reference point between a (R)AN and a UPF
N4: Reference point between an SMF and a UPF
N5: Reference point between a PCF and an AF
N6: Reference point between a UPF and a DN
N7: Reference point between an SMF and a PCF
N8: Reference point between a UDM and an AMF
N9: Reference point between two core UPFs
N10: Reference point between a UDM and an SMF
N11: Reference point between an AMF and an SMF
N12: Reference point between an AMF and an AUSF
N13: Reference point between a UDM and an authentication server function (AUSF)
N14: Reference point between two AMFs
N15: Reference point between a PCF and an AMF for a non-roaming scenario, and a reference point between a PCF and an AMF in a visited network for a roaming scenario In a 5G communication system, a network slicing technology enables multiple virtualized and independent logical networks in one physical network. To satisfy specialized requirements of services/applications, a network operator provides services by configuring a virtual end-to-end network called a network slice (or slice). The network slice is identified with an identifier called single-network slice selection assistance information (S-NSSAI). A network transmits a set of slices allowed to a UE (e.g., allowed NSSAI(s)) to the UE in a UE registration procedure, and the UE may transmit and receive application data through a protocol data unit (PDU) session created through one S-NS-SAI (i.e., a network slice) of these.

Herein, the AMF 120 or the SMF 135 may store information about slices subject to slice remapping (S-NSSAIs subject to slice remapping), and may either obtain alternative slice information per slice from the PCF 140 or the UDM 145 in advance, and use the corresponding information to determine a new slice when a slice for which remapping is required occurs among the slices subject to remapping, or determine a new slice (selected S-NSSAI) by requesting the new slice from the PCF 140 for a slice for which remapping is required when the slice for which remapping is required occurs among the slices subject to remapping.

When the new slice is determined for the slice for which remapping is required, the AMF 120 or SMF 135 may perform a procedure to obtain a PDU session to the new slice according to a service session continuity (SSC) mode of each PDU session for PDU sessions for the slice for which remapping is required.

Additionally, when the new slice is determined for the slice for which remapping is required, the AMF 120 or SMF 135 may create a PDU session based on identifier information of the new slice instead of a slice subject to remapping when the UE 100 requests to create the PDU session for the slice subject to remapping, and inform the UE 100 of identifier information of the created PDU session.

Disclosed herein is a control method to ensure that the number of active UEs for an arbitrary network slice does not exceed the maximum number of UEs set for the corresponding slice, i.e., a network slice admission control (NSAC) method based on the number of active UEs. Disclosed are a discovery method of an NSACF which is an entity that supports NSAC based on the number of active UEs for a network slice, a method for determining an NSAC method for a network slice (e.g., an NSAC method based on the number of active UEs, an NSAC method based on the number of registered UEs, and/or the like), and a method of providing a third party with the number of active UEs per network slice.

Figure 2:
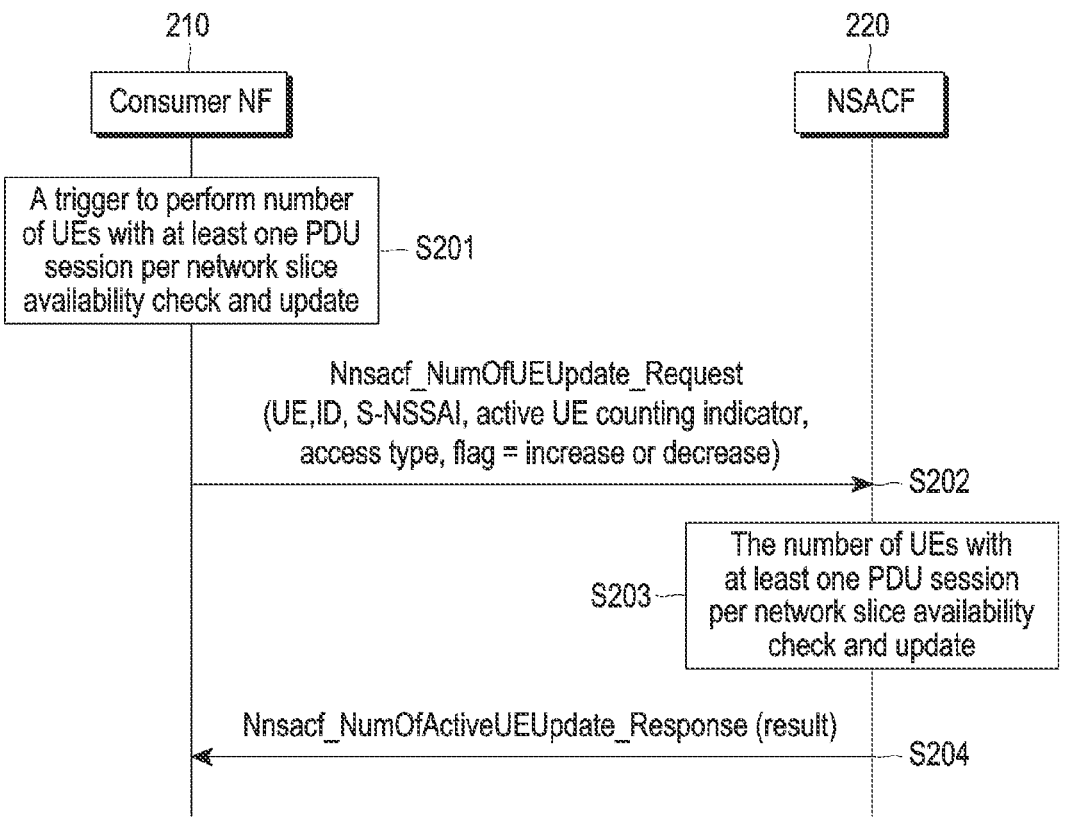
FIG. 2 illustrates a method for controlling a network slice according to an embodiment.

FIG. 2 illustrates a method for controlling a network slice according to an embodiment.

In step S201, a consumer NF (or a network entity) 210 may determine whether to perform an update on the number of UEs (terminals) per slice. For example, the consumer NF may be an AMF, an SMF, or another NSACF (e.g., a primary NSACF (an NSACF of a higher layer in a hierarchical NSACF structure)). The SMF may support a function of a PGW-C at the same time, in which case the SMF corresponds to an SMF+PGW-C. Several schemes to update the number of UEs per slice will now be described.

An update scheme based on the number of slice registered UEs (a scheme of updating the number of UEs registered with a network slice) may be included. In this scheme, if a network slice subject to NSAC is included in or deleted from an allowed slice (Allowed NSSAI) of a UE, the consumer NF 210 (e.g., an AMF) may request the NSACF 220 to perform a procedure to update the number of UEs per slice. In a request message for updating the number of UEs, an update flag may be set to increase or decrease for each case.

An update scheme based on the number of active UEs on the network slice (i.e., a scheme of updating the number of UEs with at least one PDU session) may be included. For a network slice subject to NSAC, if a UE occurs that has one or more PDU sessions (or PDN connections) to the corresponding slice (for example, if the UE requests establishment of the first PDU session (or PDN connection) for S-NSSAI), for the network slice subject to the NSAC, if a UE occurs that does not have a PDU session (or PDN connection) to the corresponding slice (for example, if the last PDU session (or PDN connection) for S-NSSAI is released for the UE), or if the network slice subject to the NSAC is deleted from an allowed slice, an update procedure for the number of active UEs may be performed for the corresponding slice. In a request message for updating the number of active UEs, an update flag may be set to increase or decrease for each case. The update scheme based on the number of active UEs may use the number of UEs which use at least one PDU session.

If the consumer NF 210 supports at least one of the above-described schemes of updating the number of UEs per slice, the consumer NF 210 may determine the scheme for updating the number of UEs per slice among the slices subject to NSAC based on information about a scheme of updating the number of UEs per slice or for all slices stored in configuration information, UE context information within the AMF, and information about a scheme of updating the number of UEs per slice received from the UDM or another NF.

In step S202, the consumer NF 210 may transmit a request message for updating the number of UEs to the NSACF 220.

If the consumer NF 210 determines to perform the update based on the update scheme based on the number of active UEs (i.e., an NSAC scheme based on the number of UEs with at least one PDU Session/PDN Connection) in step S201 (for example, if a consumer NF is set to the NSAC scheme based on the number of UEs with at least one PDU Session/PDN Connection), the consumer NF 210 may use the same request message (e.g., an Nnsacf_NSAC_NumO-fUEsUpdate_Request message) as the update scheme based on the number of slice registered UEs. In this case, the request message may include an active UE counting indi-cator indicating the update scheme based on the number of active UEs. When the consumer NF 210 performs the update scheme based on the number of active UEs, the request message transmitted by the consumer NF 210 to the NSACF 220 may be a separate message defined for updating the number of active UEs.

The request message may include a UE identifier (UE ID), a slice identifier, and identifier of a slice requesting an update on the number of UEs (S-NSSAI), an active UE counting indicator of a scheme of updating the number of UEs being an update scheme based on the number of active UEs (however, if a message separately defined for updating the number of active UEs is used, the active UE counting indicator may not be included), information for determining an access type (e.g., a third generation partnership project (3GPP) access or a non-3GPP access) of a UE, or whether an access the UE is subject to NASC (access type), and an update flag which may be set to increase if a UE occurs that has at least one PDU session (or PDN connection) to a network slice subject to NSAC for the corresponding slice (for example, if the UE requests establishment of the first PDU session or PDN connection for S-NSSAI), and may be set to decrease if a UE occurs that does not have a PDU session or PDN connection to the network slice subject to NSAC for the corresponding slice (for example, if the last PDU session or PDN connection for S-NSSAI is released for the UE), or if the network slice subject to NSAC is deleted from an allowed slice.

In step S203, the NSACF 220 may check the number of UEs with at least one PDU session per network slice availability and update the number of UEs. That is, the NSACF 220 determines whether an access type of the message received in step S202 is subject to NSAC based on configuration information, and if the access type is not subject to NSAC, accepts the update request without increasing or decreasing the number of UEs (that is, a response message transmitted to the consumer NF 210 in step S204 may include a result indicating permission).

If the request message received in step S202 includes the active UE counting indicator, or if the request message received in step S202 is the message separately defined for active UE counting, and if the update flag in the request message received in step S202 is set to increase, the NSACF 220 may operate as follows.

If the UE ID included in the request message is already included in a list of active UEs for the S-NSSAI indicated by the request message received in step S202, the NSACF 220 maintains the number of active UEs for the corresponding S-NSSAI without increasing or decreasing the number of active UEs. If the UE ID included in the request message does not exist in an active UE list for the S-NSSAI indicated by the request message received in step S202, the NSACF 220 counts the number of currently active UEs for the corresponding S-NSSAI and determines whether the num-ber of currently active UEs for the corresponding S-NSSAI has reached a preset maximum number of active UEs with the network slice. If the number of currently active UEs counted for the corresponding S-NSSAI does not reach the maximum number of active UEs, the NSACF 220 adds the corresponding UE ID to the active UE list and increases the number of currently active UEs for the corresponding slice. If it is determined that the number of currently active UEs for the corresponding S-NSSAI has reached the maximum number of active UEs, the NSACF 220 may set a result value indicating that the maximum number of active UEs has been reached for the corresponding slice and include the result value in a response message.

In step S204, the NSACF 220 may transmit, to the consumer NF 210, the response message to the request message in step S202. The response message may include information (e.g., a result per S-NSSAI) indicating a result of updating the number of UEs per slice. If the update request message in step S202 is a request message for updating the number of UEs which is based on the update scheme based on the number of active UEs, the information (Result per S-NSSAI) indicating the result of updating may include information indicating 'maximum number of UEs with at least one PDU session or PDN connection is reached' (i.e., indicating that the number of UEs with at least one PDU session or PDN connection has reached the maximum number) or 'maximum number of UEs with at least one PDU session or PDN connection is not reached' (i.e., indicating that the number of UEs with at least one PDU session or PDN connection has not reached the maximum number).

If the consumer NF 210 is the AMF, the request message in step S202 is for updating the number of UEs which is based on the update scheme based on the number of active UEs, and the information (Result per S-NSSAI) indicating the result of updating indicates that the number of UEs with at least one PDU session or PDN connection has reached the maximum number, the consumer NF 210 (e.g., the AMF) receiving the response message may transmit, to the SMF, a message to release the PDU session connected to the cor-responding S-NSSAI. The corresponding message may include information indicating 'maximum number of UEs with at least one PDU session or PDN connection is reached' (i.e., indicating that the number of UEs with at least one PDU session or PDN connection has reached the maximum number) as a cause. Thereafter, the SMF may include the cause indicating 'maximum number of UEs with at least one PDU session or PDN connection is reached' (i.e., indicating that the number of UEs with at least one PDU session or PDN connection has reached the maximum number) in a NAS message transmitted to the UE for releasing a PDU session.

If the consumer NF 210 is the SMF, the request message in step S202 is the request message for updating the number of UEs which is based on the update scheme based on the number of active UEs, and the information (Result per S-NSSAI) indicating the result of updating indicates that the number of UEs with at least one PDU session or PDN connection has reached the maximum number, the SMF may perform a procedure for releasing a PDU session or rejecting PDU session establishment request. The SMF may include a cause indicating 'maximum number of UEs with at least one PDU session or PDN connection is reached' (i.e., indicating that the number of UEs with at least one PDU session or PDN connection has reached the maximum number) in a NAS message transmitted to the UE for releasing a PDU session or rejecting PDU session establishment request.

Figure 3:
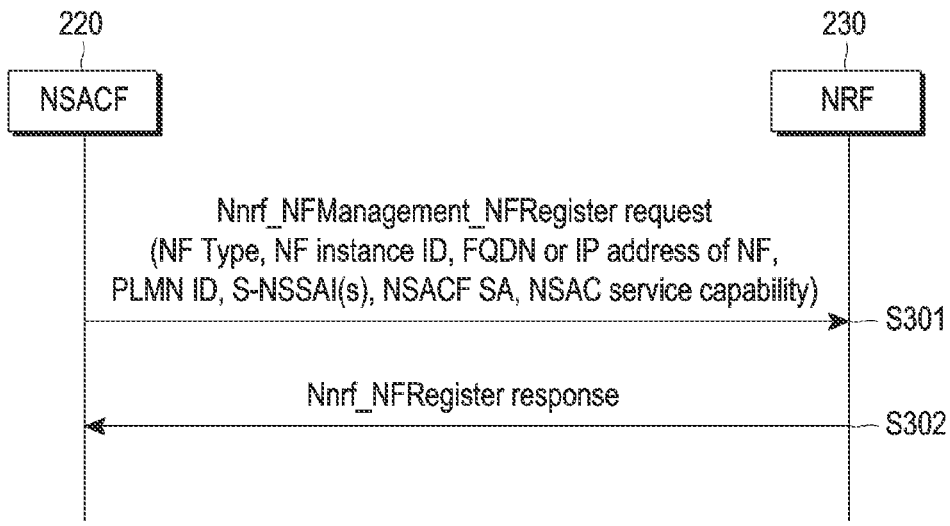
FIG. 3 illustrates a method for registering an NSACF according to an embodiment.

FIG. 3 illustrates a method for registering an NSACF according to an embodiment.

In step S301, if an NSACF 220 supports a method of updating the number of active UEs, the NSACF 220 may include information (i.e., support of active UE counting) indicating that the NSACF 220 supports active UE counting in a registration request message transmitted to a network repository function (NRF) 230. Alternatively, if the NSACF 220 supports the method of updating the number of active UEs, the NSACF 220 may include the information indicating that the NSACF 220 supports the active UE counting in an NSAC service capability included in the registration request message transmitted to the NRF 230.

The registration request message transmitted from the NSACF 220 to the NRF 230 may include a type of a network function (NF type), a network function instance identifier (NF instance ID), a fully qualified domain name (FQDN) or IP address of NF, a domain address or IP address of a network function, a public land mobile network (PLMN) ID: PLMN identifier, slice identifier information (S-NSSAI(s) and NSACF SA), and an NSAC service capability including information (e.g., support of active UE counting) indicating whether an NSACF supports active UE counting.

In step S302, when receiving the request message from the NSACF 220, the NRF 230 may determine whether registration of a network function is possible and perform the registration. If the registration is possible, the NRF 230 may include information indicating the registration has been performed in a response message and transmit the response message to the NSACF 220. If the registration is not possible, the NRF 230 may transmit a response message to notify that the registration is not possible.

Figure 4:
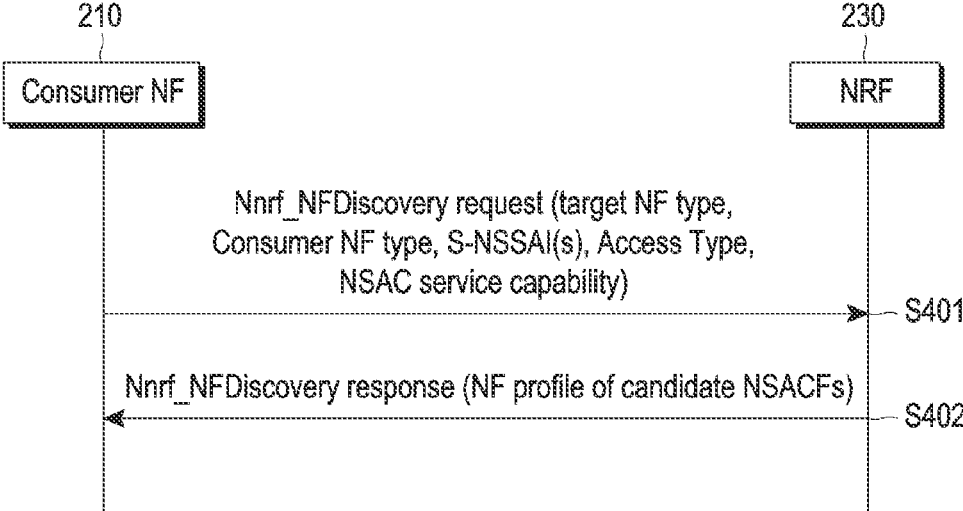
FIG. 4 illustrates a method for discovering an NSACF according to an embodiment.

FIG. 4 illustrates a method for discovering an NSACF according to an embodiment.

In step S401, if the consumer NF 210 wishes to know an NF profile including information (e.g., an address of an NSACF (an IP address and a domain address), etc.) related to the NSACF which supports an update on the number of active UEs, the consumer NF 210 may transmit a discovery request (e.g., an NF discovery request) to an NRF 230. The discovery request message may include information on a type of an NF to be targeted (Target NF type) which may be an NSACF, information indicating a type of the consumer NF 210 requested (consumer NF type), S-NSSAI(s), an access type of a UE (access type), NSAC service capability (If the consumer NF 210 wishes to find an NSACF which supports a scheme of updating the number of UEs based on the number of active UEs, information indicating that the consumer NF 210 supports the scheme of updating the number of UEs based on the number of active UEs may be included in an NSAC service capability), and support of active UE counting (If the consumer NF 210 wishes to find the NSACF which supports the scheme of updating the number of UEs based on the number of active UEs, and the information indicating that the consumer NF 210 supports the scheme of updating the number of UEs based on the number of active UEs is not included in the NSAC service capability, support of active UE counting may be included).

In step S402, if the information indicating that the consumer NF 210 supports the scheme of updating the number of UEs based on the number of active UEs is included in the NSAC service capability included in the discovery request message received in S401, or support of active UE counting is included in the discovery request message, the NRF 230 may support an active UE and include NF profiles of NSACFs which support the S-NSSAIs and access type within the discovery request message in a discovery response message transmitted to the consumer NF 210.

Figure 5:
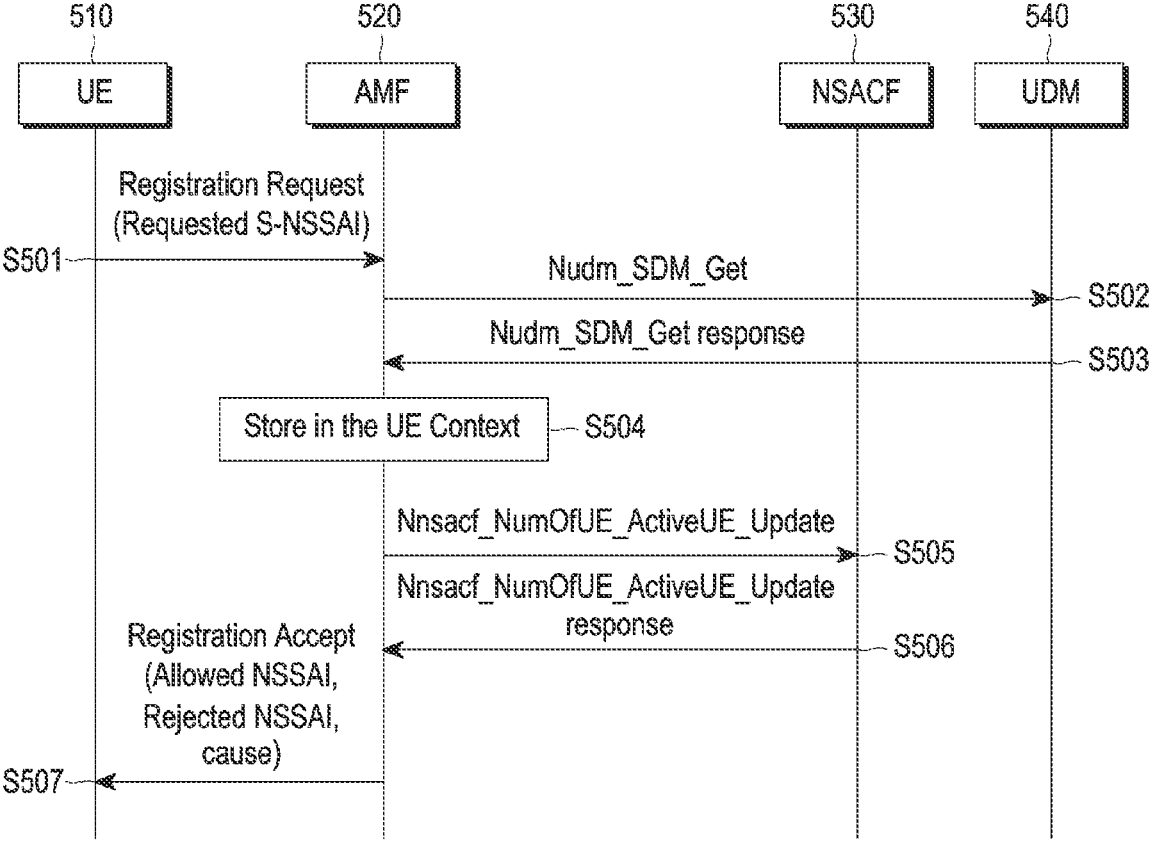
FIG. 5 illustrates a method for controlling a network slice in a UE registration procedure according to an embodiment.

FIG. 5 illustrates a method for controlling a network slice in a UE registration procedure according to an embodiment.

In step S501, a UE 510 may transmit a registration request message to an AMF 520. The registration request message may include information about a requested slice (requested NSSAI) which the UE 510 wishes to use.

In step S502, the AMF 520 may transmit, to a UDM 540, a message requesting UE subscription information of the UE 510. The message may include an identifier (UE ID) of the UE 510 requesting registration.

In step S503, the UDM 540 may include subscriber information related to the UE ID included in the message received in S502 in a response message and transmit the response message to the AMF 520. The subscriber information may include information about subscribed slices (Subscribed S-NSSAIs), information about a slice subject to NSAC (S-NSSAIs subject to NSAC), and information indicating a supported scheme of updating the number of UEs per slice (Number of UE per S-NSSAI update method). The information indicating the supported scheme of updating the number of UEs per slice may indicate that at least one of a method based on the number of active UEs and a method based on the number of registered UEs is supported. If slice information is not included in the information indicating the supported scheme of updating the number of UEs per slice, the same method may be applied to all subscribed S-NSSAIs.

In step S504, the AMF 520 may store the information included in the response message received in step S503 in a UE context.

In step S505, if a UE which has at least one PDU session (or PDN connection) to a network slice subject to NSAC occurs for the corresponding slice (for example, in an evolved packet system (EPS), if a UE which has a PDN connection for S-NSSAI subject to NSAC requests a registration for the corresponding slice in the S-NSSAI subject to NSAC included in the requested NSSAI, if a UE which has a PDU session for S-NSSAI subject to NSAC requests a registration for the corresponding slice in another PLMN (i.e., the S-NSSAI subject to NSAC included in the requested NSSAI), and if a UE transmits a request to establish a first PDU session (or PDN connection) for the corresponding S-NSSAI subject to NSAC, etc.), the AMF 520 may determine whether to perform update on the number of UEs per slice for the corresponding slice, and request the NSACF 530 to update the number of UEs. The AMF 520 may determine the scheme for updating the number of UEs per slice among the slices subject to NSAC based on information about a scheme of updating the number of UEs per slice or for all slices stored in configuration information, UE context information in the AMF 520, and information about a scheme of updating the number of UEs per slice received from a UDM or another NF. If the AMF 520 determines to perform the update based on a scheme of updating the number of UEs based on the number of active UEs, the same request message as an update scheme based on the number of slice registered UEs may be used. In this case, the request message may include the active UE counting indicator. If the AMF 520 performs the scheme of updating the number of UEs based on the number of active UEs, a request message transmitted from the AMF 520 to the NSACF 530 may be a separate message defined for updating the number of active UEs. The request message may include the UE ID, the S-NSSAI, the active UE counting indicator (unless the message which is separately defined for updating the number of active UEs is used), the access type, and the update flag, as previously described herein.

In step S506, the NSACF 530 determines whether the access type in the update request message received in step S505 is subject to NSAC based on the configuration information. If the access type is not subject to NSAC, the NSACF 530 may accept the update request without increasing or decreasing the number of UEs (that is, a response message transmitted to the AMF 520 may include a result value indicating acceptance).

If the received update request message includes the active UE counting indicator, or if the update request message is separately defined for the active UE counting, and if the update flag in the received update request message is set to increase, the NSACF 530 may operate as follows.

If the UE ID included in the request message is already included in a list of active UEs for the S-NSSAI indicated by the received request message, the NSACF 530 may maintain the number of active UEs for the corresponding S-NSSAI without increasing or decreasing the number. If the UE ID included in the request message does not exist in an active UE list for the S-NSSAI indicated by the received update request message, the NSACF 530 may count the number of currently active UEs for the corresponding S-NSSAI and determine whether the number of currently active UEs for the corresponding S-NSSAI has reached a preset maximum number of active UEs (i.e., maximum number of active UEs with the network slice). If the number of currently active UEs counted for the corresponding S-NSSAI has not reached the maximum number of active UEs, the NSACF 530 may add the corresponding UE ID to the active UE list and increase the number of currently active UEs for the corresponding slice. If it is determined that the number of currently active UEs for the corresponding S-NSSAI has reached the maximum number of active UEs, the NSACF 530 may set a result value indicating that the maximum number of active UEs has reached for the corresponding slice and include the result value in a response message.

In step S506, the NSACF 530 may transmit, to the AMF 520, a response message to the request message in step S505. The response message may include information (e.g., a result per S-NSSAI) indicating a result of updating the number of active UEs per slice. If the request message is an update request message for updating the number of active UEs, the information (Result per S-NSSAI) indicating the result of updating may include information indicating 'maximum number of UEs with at least one PDU session or PDN connection is reached' (i.e., indicating that the number of UEs with at least one PDU session or PDN connection has reached the maximum number) or 'maximum number of UEs with at least one PDU session or PDN connection is not reached' (i.e., indicating that the number of UEs with at least one PDU session or PDN connection has not reached the maximum number).

For an S-NSSAI (network slice) that has reached the maximum number of active UEs, the NSACF 530 may include the result per S-NSSAI indicating an update result indicating 'maximum number of UEs with at least one PDU session or PDN connection is reached' (i.e., indicating that the number of UEs with at least one PDU session or PDN connection has reached the maximum number) and back-off timer information for the corresponding slice in the response message to the request message in step S505 transmitted to the AMF 520, and transmit the response message. Back-off timer information per slice includes time information and indicates that a request for a corresponding slice should not be performed during corresponding time. Access type information may be provided along with the back-off timer information per slice, and may indicate that a request for a corresponding slice for a corresponding access type should not be performed during the corresponding time.

In step S507, the AMF 520 may transmit a registration response message (registration accept) in response to the registration request message to the UE 510. If the information (i.e., a result per S-NSSAI) indicating the result of updating the number of active UEs per slice included in the update response message received in step S506 indicates 'maximum number of UEs with at least one PDU session or PDN Connection is reached', the AMF 520 may include a corresponding slice in rejected NSSAI included in a registration accept message, and may include a cause value (i.e., cause for slice registration rejection) indicating 'maximum number of UEs with at least one PDU session or PDN Connection is reached' for the corresponding slice. Cause per slice may be included in the rejected NSSAI or may not be included in the rejected NSSAI and may instead be defined as a separate parameter. If the back-off timer information per slice and the access type information are present in the update response message received in step S506, the AMF 520 may include back-off timer information per slice and access type information in the registration accept message.

Alternatively, if the result per S-NSSAI indicating the result of updating the number of active UEs per slice in the update response message received in step S506 indicates 'maximum number of UEs with at least one PDU session or PDN Connection is not reached', the AMF 520 may include a corresponding slice in allowed NSSAI included in the registration accept message, and may include a cause value for slice registration acceptance indicating 'maximum number of UEs with at least one PDU session or PDN Connection is not reached'. Cause per slice may be included in the allowed NSSAI or may not be included in the allowed NSSAI and may instead be defined as a separate parameter.

If the requested S-NSSAI is included in the Rejected NSSAI included in the registration accept message received from the AMF 520, and there is a slice with cause indicating 'maximum number of UEs with at least one PDU session or PDN Connection is reached' among the slices, the UE 510 may not request PDU session creation for the corresponding slice. If back-off timer information for a slice exists in the registration accept message, the UE 510 may not transmit a PDU session creation message during time included in the back-off timer information for the slice. If the registration accept message includes back-off timer information and access type information, the UE 510 may not transmit a PDU session creation message during time included in the back-off timer information for a corresponding access type and a slice for which the back-off timer information exists. After the time included in the back-off timer information has elapsed, the UE 510 may perform a PDU session creation request for the corresponding slice. Alternatively, if back-off timer information for a slice exists in the registration accept message, the UE 510 may not include the slice in requested NSSAI in a registration request message during time included in the back-off timer information. If the registration accept message includes access type information along with back-off timer information, during time included in the back-off timer information for a corresponding access type and a slice for which the back-off timer information exists, the UE 510 may not include the corresponding slice in requested NSSAI in a registration request message.

Figure 6:
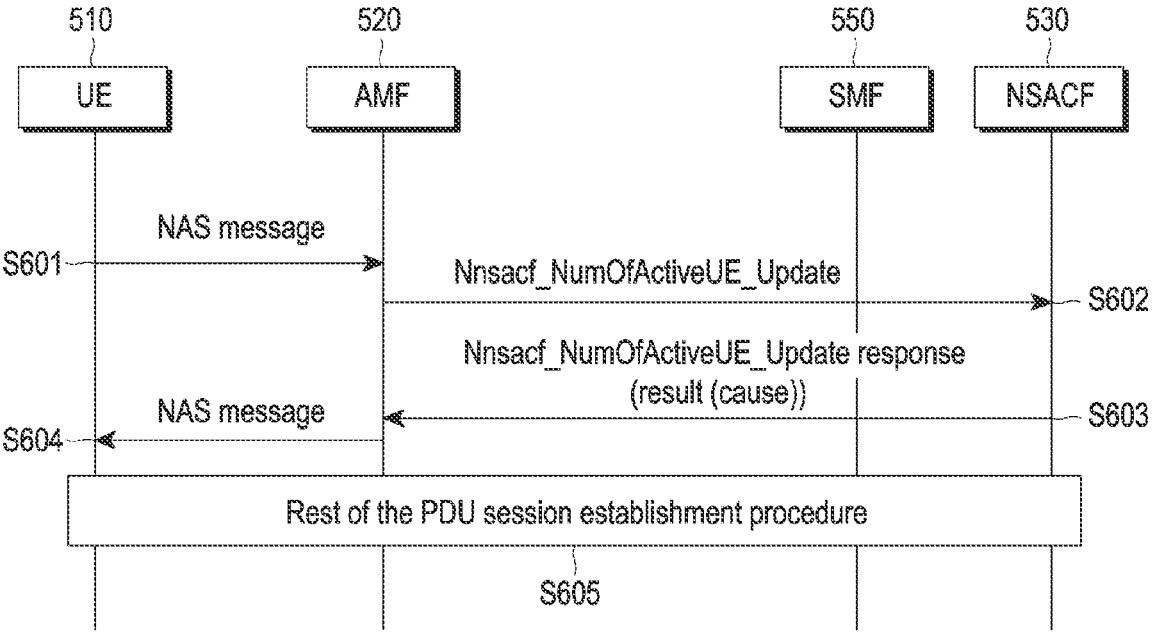
FIG. 6 illustrates a method of controlling a network slice in a PDU session creation procedure according to an embodiment.

FIG. 6 illustrates a method of controlling a network slice in a PDU session creation procedure according to an embodiment.

In step S601, a UE 510 may transmit a NAS message including a PDU session creation request message to an AMF 520. The NAS message may include S-NSSAI, a data network name (DNN), a PDU Session ID, and an N1 SM container (PDU session establishment request).

In step S602, if the S-NSSAI included in the received NAS message is a slice subject to NSAC, as determined based on configuration information or UE context information stored in the AMF 520, the AMF 520 may transmit a request message for updating the number of UEs for the corresponding slice to the NSACF 530. If a scheme of updating the number of UEs for the corresponding slice or for all slices is set to a scheme of updating the number of UEs based on the active UEs in the configuration information or the UE context information stored in the AMF 520, the AMF 520 may transmit an update request message to the NSACF 530 in a similar manner to step S505 in FIG. 5. If a UE which has at least one PDU session or PDN connection to a network slice subject to NSAC occurs for the corresponding slice, if a UE which has a PDU session for S-NSSAI subject to NSAC requests a registration for the corresponding slice in another PLMN (i.e., the S-NSSAI subject to NSAC included in requested NSSAI), and if a UE transmits a request to establish a first PDU session or PDN connection for the corresponding S-NSSAI subject to NSAC, etc.), the AMF 520 may determine whether to perform the scheme of updating the number of UEs per slice for the corresponding slice, and request the NSACF 530 to update the number of UEs. The AMF 520 may determine the scheme for updating the number of UEs per slice among the slices subject to NSAC based on information about a scheme of updating the number of UEs per slice or for all slices stored in configuration information, UE context information in the AMF 520, and information about a scheme of updating the number of UEs per slice received from a UDM or another NF. If the AMF 520 determines to perform the update based on a scheme of updating the number of UEs based on the number of active UEs, the same request message as an update scheme based on the number of slice registered UEs may be used. In this case, the request message may include an active UE counting indicator indicating the scheme of updating the number of UEs based on the number of active UEs. If the AMF 520 performs the scheme of updating the number of UEs based on the number of active UEs, a request message transmitted from the AMF 520 to the NSACF 530 may be a separate message defined for updating the number of active UEs. The request message may include a UE ID, S-NSSAI, an active UE counting indicator, access type, and the update flag, as previously described herein.

In step S603, the NSACF 530 determines whether the access type in the update request message received in step S602 is subject to NSAC based on the configuration information. If the access type is not subject to NSAC, the NSACF 530 may accept the update request without increasing or decreasing the number of UEs. That is, a response message transmitted to the AMF 520 may include a result value indicating acceptance.

If the received update request message includes the active UE counting indicator, or if the update request message is the message separately defined for the active UE counting, and if the update flag in the received update request message is set to increase, the NSACF 530 may operate as follows.

If the UE ID included in the request message is already included in a list of active UEs for the S-NSSAI indicated by the received request message, the NSACF 530 may maintain the number of active UEs for the corresponding S-NSSAI without increasing or decreasing the number. If the UE ID included in the request message does not exist in an active UE list for the S-NSSAI indicated by the received update request message, the NSACF 530 may count the number of currently active UEs for the corresponding S-NSSAI and determine whether the number of currently active UEs for the corresponding S-NSSAI has reached a preset maximum number of active UEs with the network slice. If the number of currently active UEs counted for the corresponding S-NSSAI has not reached the maximum number of active UEs, the NSACF 530 may add the corresponding UE ID to the active UE list and increase the number of currently active UEs for the corresponding slice. If it is determined that the number of currently active UEs for the corresponding S-NS-SAI has reached the maximum number of active UEs, the NSACF 530 may set a result value indicating that the maximum number of active UEs has reached for the corresponding slice and include the result value in a response message.

In step S603, the NSACF 530 may transmit, to the AMF 520, a response message to the request message in step S602. The response message may include a result per S-NSSAI indicating a result of updating the number of UEs per slice. If the update request message is a request message for updating the number of active UEs, the result per S-NSSAI indicating the result of updating may include information indicating 'maximum number of UEs with at least one PDU session or PDN connection is reached' (i.e., indicating that the number of UEs with at least one PDU session or PDN connection has reached the maximum number) or 'maximum number of UEs with at least one PDU session or PDN connection is not reached' (i.e., indicating that the number of UEs with at least one PDU session or PDN connection has not reached the maximum number).

When an S-NSSAI has reached the maximum number of active UEs, the NSACF 530 may include the result per S-NSSAI indicating 'maximum number of UEs with at least one PDU session or PDN connection is reached' (i.e., indicating that the number of UEs with at least one PDU session or PDN connection has reached the maximum number), back-off timer information for the corresponding slice, and access type information in the response message to the request message in step S602 transmitted to the AMF 520, and transmit the response message. Back-off timer information per slice includes time information and indicates that a request for a corresponding slice should not be performed during the corresponding time. The access type information may be provided along with the back-off timer information per slice, and may be included to indicate that a request for a corresponding slice for a corresponding access type should not be performed during the corresponding time.

In step S604, the AMF 520 may transmit an NAS message (i.e., a PDU session accept message or PDU session reject message to the UE 510. If a cause included in the update response message received from the NSACF 530 in step S603 indicates 'maximum number of UEs with at least one PDU session or PDN Connection is reached', the AMF 520 may include information indicating that the PDU session creation request is rejected and a cause indicating 'maximum number of UEs with at least one PDU session or PDN Connection is reached' in the NAS message transmitted to the UE 510. If the back-off timer information per slice and the access type information are present in the response message received in step S603, the AMF 520 may include back-off timer information per slice and access type information in the response message to the PDU session creation request.

In step S605, if the cause included in the message received from the NSACF 530 in step S603 indicates 'maximum number of UEs with at least one PDU session or PDN Connection is not reached', the AMF 520 may perform the remaining PDU session creation procedure without performing step S504.

If the response message to the PDU session creation request includes a slice for which back-off timer information exists, the UE 510 may not transmit a PDU session create request message during time included in the back-off timer information for the slice. If the response message to the PDU session creation request includes access type information along with back-off timer information, the UE 510 may not transmit a PDU session create request message during time included in the back-off timer information for the slice for a slice for which back-off timer information exists and a corresponding access type. After the time included in the back-off timer information has elapsed, the UE 510 may perform a PDU session creation request for the corresponding slice.

Figure 7:
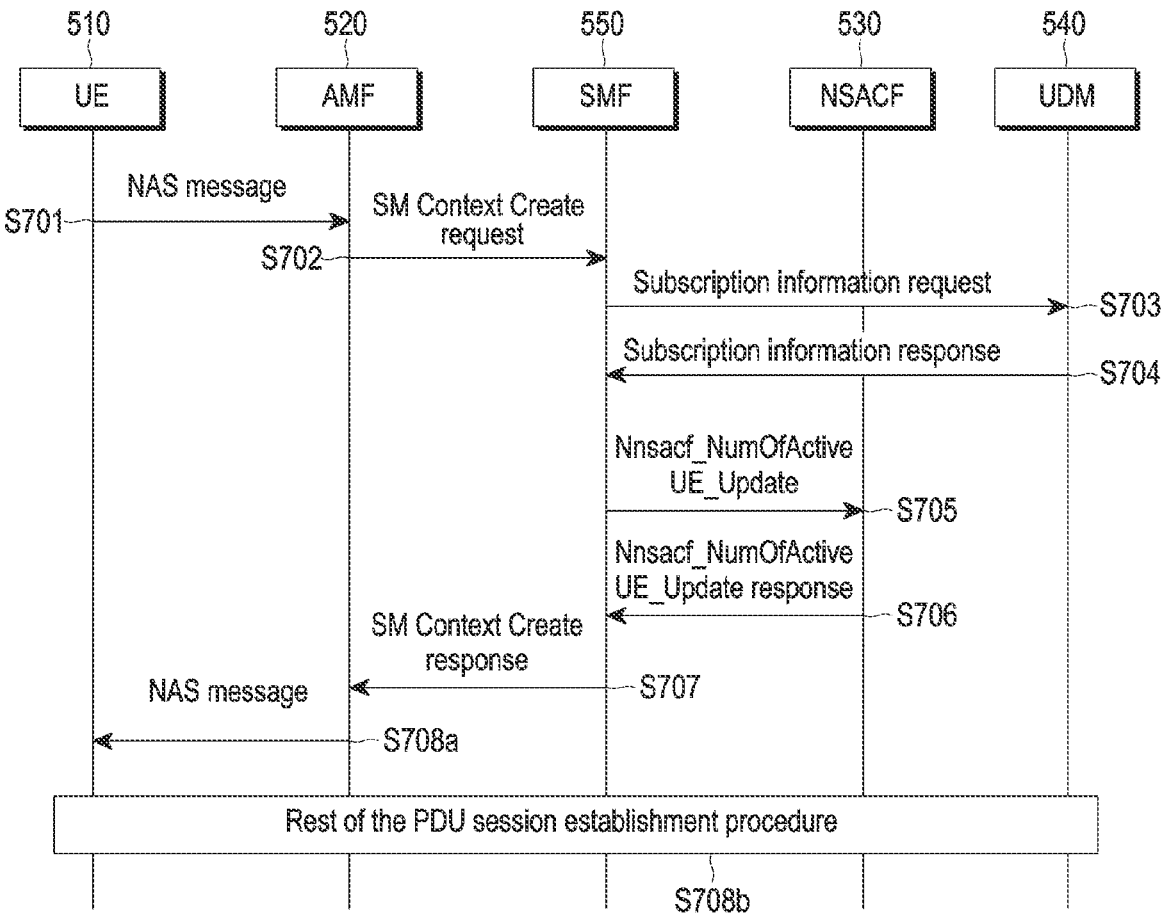
FIG. 7 illustrates another method of controlling a network slice in a PDU session creation procedure according to an embodiment.

FIG. 7 illustrates another method of controlling a network slice in a PDU session creation procedure according to an embodiment.

In step S701, a UE 510 may transmit a NAS message including a PDU session creation request message to an AMF 520. The NAS message may include S-NSSAI, a DNN, a PDU session ID, and an N1 SM container (PDU session establishment request).

In step S702, the AMF 520 may select an SMF 550 based on the S-NSSAI and the DNN included in the NAS message received in step S701. The AMF 520 may transmit an SM context create request message to the selected SMF 550. The message may include the S-NSSAI, the DNN, the PDU session ID, and the PDU session request included in the NAS message received in step S701.

In step S703, the SMF 550 may transmit, to a UDM 540, a message requesting subscription information for the UE 510 performing a PDU session procedure. The message requesting the subscription information may include a UE ID, an S-NSSAI, and a DNN of the requested UE 510.

In step S704, the UDM 540 may include the subscription information related to the UE ID, the S-NSSAI, and the DNN received in step S703 in a message transmitted to the SMF 550. The message may include the number of UE per S-NSSAI update method, which is the supported method of updating the number of UEs indicating that at least one of a method of updating the number of UEs based on the number of active UEs and a method of updating the number of UEs based on the number of registered UEs is supported. If slice information is not included the in supported method of updating the number of UEs per S-NSSAI update method, the same method may be applied to all subscribed S-NSSAIs.

In step S705, if the S-NSSAI is subject to NSAC, as determined based on configuration information or UE context information stored in the SMF 550, the SMF 550 may transmit a request message for updating the number of UEs for the corresponding slice to the NSACF 530. If a scheme of updating the number of UEs for the corresponding slice or for all slices is set to a scheme of updating the number of UEs based on the number of active UEs in the configuration information or the UE context information stored in the SMF 550, the SMF 550 may transmit an update request message to the NSACF 530 in a manner similar to step S602 in FIG. 6. If a UE which has at least one PDU session or PDN connection to a network slice subject to NSAC occurs for the corresponding slice, if a UE which has a PDU session for S-NSSAI subject to NSAC requests a registration for the corresponding slice in another PLMN (i.e., the S-NSSAI subject to NSAC included in the requested NSSAI), and if a UE requests to establish a first PDU session or PDN connection for the S-NSSAI subject to NSAC, the SMF 550 may determine whether to perform update the number of UEs per slice for the corresponding slice, and request the NSACF 530 to update the number of UEs. The SMF 550 may determine the scheme for updating the number of UEs per slice among the slices subject to NSAC based on information about a scheme of updating the number of UEs per slice or for all slices stored in configuration information, UE context information in the SMF 550, and information about a scheme of updating the number of UEs per slice received from a UDM or another NF. If the SMF 550 determines to perform the update based on a scheme of updating the number of UEs based on the number of active UEs, the same request message as an update scheme based on the number of slice registered UEs may be used. In this case, the request message may include an active UE counting indicator indicating the scheme of updating the number of UEs based on the number of active UEs. If the SMF 550 performs the scheme of updating the number of UEs based on the number of active UEs, a request message transmitted from the SMF 550 to the NSACF 530 may be a separate message defined for updating the number of active UEs. The request message may include the UE ID, the S-NSSAI, the active UE counting indicator, the access type, and the update flag, as previously described herein.

In step S706, the NSACF 530 determines whether the access type in the update request message received in step S705 is subject to NSAC based on the configuration information. If the access type is not subject to NSAC, the NSACF 530 may accept the update request without increasing or decreasing the number of UEs (that is, a response message transmitted to the SMF 550 may include a result value indicating acceptance).

If the received update request message includes the active UE counting indicator, or if the update request message is separately defined for the active UE counting, and if the update flag in the received update request message is set to increase, the NSACF 530 may operate as follows.

If the UE ID included in the request message is already included in a list of active UEs for the S-NSSAI indicated by the received request message, the NSACF 530 may maintain the number of active UEs for the corresponding S-NSSAI without increasing or decreasing the number. If the UE ID included in the request message does not exist in an active UE list for the S-NSSAI indicated by the received update request message, the NSACF 530 may count the number of currently active UEs for the corresponding S-NSSAI and determine whether the number of currently active UEs for the corresponding S-NSSAI has reached a preset maximum number of active UEs with the network slice. If the number of currently active UEs counted for the corresponding S-NSSAI has not reached the maximum number of active UEs, the NSACF 530 may add the corresponding UE ID to the active UE list and increase the number of currently active UEs for the corresponding slice. If it is determined that the number of currently active UEs for the corresponding S-NS-SAI has reached the maximum number of active UEs, the NSACF 530 may set a result value indicating that the maximum number of active UEs has reached for the corresponding slice and include the result value in a response message.

In step S706, the NSACF 530 may transmit, to the SMF 550, a response message to the update request message in step S705. The response message may include a result per S-NSSAI indicating a result of updating the number of UEs per slice. If the update request message is for updating the number of active UEs, the result per S-NSSAI indicating the result of updating may include information indicating 'maximum number of UEs with at least one PDU session or PDN connection is reached' (i.e., indicating that the number of UEs with at least one PDU session or PDN connection has reached the maximum number) or 'maximum number of UEs with at least one PDU session or PDN connection is not reached' (i.e., indicating that the number of UEs with at least one PDU session or PDN connection has not reached the maximum number).

When an S-NSSAI has reached the maximum number of active UEs, the NSACF 530 may include information (Result per S-NSSAI) indicating an update result indicating 'maximum number of UEs with at least one PDU session or PDN connection is reached' (i.e., indicating that the number of UEs with at least one PDU session or PDN connection has reached the maximum number), back-off timer information for the corresponding slice, and access type information in the response message to the request message in step S705 transmitted to the SMF 550, and transmit the response message. Back-off timer information per slice includes time information and is information for indicating that a request for a corresponding slice should not be performed during the corresponding time. The access type information may be provided along with the back-off timer information per slice, and this may be included to indicate that a request for a corresponding slice for a corresponding access type should not be performed during the corresponding time.

In step S707, the SMF 550 may transmit, to the AMF 520, a response message to the SM Context create request message in step S702. The corresponding message may include the cause received from the NSACF 530, an SM context ID, or N1 SM container (PDU session reject (cause)). The N1 SM container may represent a message transmitted to the UE 510 through the AMF 520.

If the message received by the SMF 550 in step S706 includes a cause indicating 'maximum number of UEs with at least one PDU session or PDN connection is reached', the SMF 550 may include, to a response message transmitted to the AMF 520, the cause indicating 'maximum number of UEs with at least one PDU session or PDN connection is reached', and include an N1 SM container (PDU session reject (cause)). A cause included in PDU session reject information may be set to information indicating 'maximum number of UEs with at least one PDU session or PDN connection is reached'.

If back-off timer information per slice and access type information are present in the response message received by the SMF 550 in step S706, the SMF 550 may include the corresponding information in the N1 SM container.

If the message received by the SMF 550 in step S706 includes a cause indicating 'maximum number of UEs with at least one PDU session or PDN connection is not reached' and if it is possible to create a PDU session, a cause value indicating success and a created SM context ID may be included in a message transmitted to the AMF 520.

In step S708a, the AMF 520 may transmit the N1 SM container information included in the message received from the SMF 550 in step S707 to the UE 510 through a NAS message. The UE 510 receives a PDU session reject (cause), and if the received cause indicates 'maximum number of UEs with at least one PDU session or PDN connection is reached', the UE 510 may not request to create a PDU session for the corresponding slice. If a response message to the PDU session creation request includes a slice for which back-off timer information exists, the UE 510 may not transmit a PDU session create request message during time included in the back-off timer information for a corresponding slice. If the response message to the PDU session creation request includes access type information along with back-off timer information, the UE 510 may not transmit a PDU session create request message during time included in the back-off timer information for a slice for which back-off timer information exists and a corresponding access type. After the time included in the back-off timer information has elapsed, the UE 510 may perform a PDU session creation request for the corresponding slice.

In step S708b, if the cause in the received response message indicates 'maximum number of UEs with at least one PDU session or PDN connection is not reached', step S708a is omitted and the rest of the PDU session establishment procedure may be performed.

Figure 8:
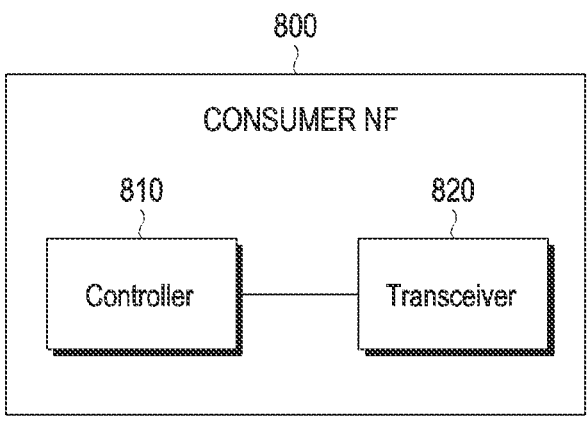
FIG. 8 illustrates a structure of a consumer NF according to an embodiment.

FIG. 8 illustrates a structure of a consumer NF according to an embodiment. A consumer NF 800 may correspond to an AMF, an SMF, or an NSACF, and respective devices may be configured separately or combined to form one device. In FIG. 8, the consumer NF 800 may include at least one controller (processor) 810 and a transceiver 820 including a receiver and a transmitter. The consumer NF 800 may include memory. The transceiver 820 and the memory may be connected to the at least one controller 810 so that the transceiver 820 and the memory may operate under the control of the at least one controller 810.

The at least one controller 810 may control a series of processes so that an operation of the consumer NF 800 (an AMF, an SMF, and an NASCF) described in relation to FIGS. 1 to 7 of the disclosure may be performed. The transceiver 820 may transmit and receive a signal to and from another NASCF entity 900 and a UE 1000. The signal may include a control message, data information, and/or the like.

Figure 9:
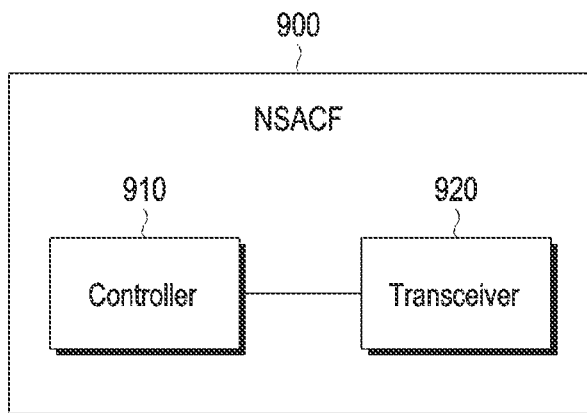
FIG. 9 illustrates a structure of an NSACF according to an embodiment.

FIG. 9 illustrates a structure of an NSACF according to an embodiment. In FIG. 9, an NSACF 900 may include at least one controller (processor) 910, and a transceiver 920 including a receiver and a transmitter. The NSACF 900 may include memory. The transceiver 920 and the memory may be connected to the at least one controller 910 so that the transceiver 920 and the memory may operate under the control of the at least one controller 910.

The at least one controller 910 may control a series of processes so that an operation of the NSACF 900 described in relation to FIGS. 1 to 7 of the disclosure may be performed. The transceiver 920 may transmit and receive a signal to and from a consumer NF 800 and a UE 1000. The signal may include a control message, data information, and/or the like.

Figure 10:
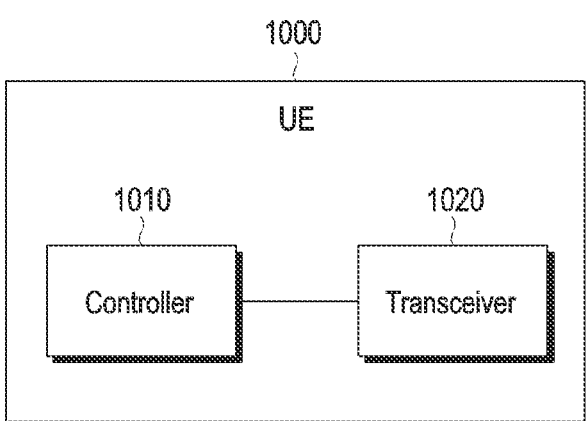
FIG. 10 illustrates a structure of a UE according to an embodiment.

FIG. 10 illustrates a structure of a UE according to an embodiment. In FIG. 10, a UE 1000 may include at least one controller (or processor) 1010, and a transceiver 1020 including a receiver and a transmitter. The UE 1000 may include memory. The transceiver 1020 and the memory may be connected to the at least one controller 1010 so that the transceiver 1020 and the memory may operate under the control of the at least one controller 1010.

The at least one controller 1010 may control a series of processes so that an operation of the UE 1000 described in relation to FIGS. 1 to 7 of the disclosure may be performed. The transceiver 1020 may transmit and receive a signal to and from a consumer NF 800 and an NSACF 900. The signal may include control information, data, and/or the like.

Network entities described herein may have the same structure as an NSACF in FIG. 9 and may be combined into one device or may be implemented as separate devices.

As described above, a method performed by a network entity in a wireless communication system may include determining to update a number of UEs for a network slice based on a first scheme, transmitting a request message requesting an update on the number of UEs for the network slice to an NSACF, and receiving a response message including information indicating a result of the update on the number of UEs for the network slice from the NSACF.

The first scheme may be a scheme of performing the update on the number of UEs for the network slice based on a number of UEs connected to at least one session for the network slice, and the request message may include an indicator indicating that the update on the number of UEs for the network slice is performed in the first scheme.

The request message may include a flag indicating whether the number of UEs for the network slice needs to be increased or decreased.

The response message may include information indicating whether the number of UEs connected to the at least one session for the network slice has reached a maximum number preset by the NSACF.

The network entity may be an access and mobility management function (AMF), a session management function (SMF), or another NSACF.

As described above, a method performed by an NSACF apparatus in a wireless communication system may include receiving a request message for an update on a number of UEs for a network slice from a network entity, identifying whether the request message includes an indicator indicating that the update on the number of UEs for the network slice is performed in a first scheme, in case that the request message includes the indicator, counting a number of UEs connected to at least one session for the network slice, and transmitting, to the network entity, a response message including information indicating a result of the update on the number of UEs for the network slice.

The request message may include a flag indicating whether the number of UEs for the network slice needs to be increased or decreased.

The method may further include determining whether the counted number of UEs connected to the at least one session for the network slice has reached a preset maximum number, and including, in the response message, information indicating whether the counted number of UEs connected to the at least one session for the network slice has reached the preset maximum number.

The method may further include, in case that that the flag included in the request message indicates that the number of UEs for the network slice needs to be increased, and it is determined that the counted number of UEs connected to the at least one session for the network slice has not reached the preset maximum number, increasing the number of UEs for the network slice.

As described above, slices may be controlled by counting only UEs with actual sessions, thereby improving a network slice resource utilization rate.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program) including one or more instructions that are stored in a storage medium (e.g., internal memory or external memory) that is readable by a machine (e.g., the electronic device). For example, a processor (e.g., the processor) of the machine (e.g., the electronic device) may invoke at least one of the one or more instructions stored in the storage medium and execute it. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

While the disclosure has been illustrated and described with reference to various embodiments of the present disclosure, those skilled in the art will understand that various changes can be made in form and detail without departing from the spirit and scope of the present disclosure as defined by the appended claims and their equivalents.

What is claimed is:

1. A method performed by a network entity in a wireless communication system, the method comprising:

triggering an update for a number of at least one user equipment (UE) with at least one packet data unit (PDU) session or packet data network (PDN) connection established on a network slice, when a UE establishes a first PDU session or a first PDN connection associated with the network slice, or a last PDU session or a last PDN connection associated with the network slice is released;

transmitting, to a network slice admission control function (NSACF), an update request message for the number of the at least one UE; and receiving, from the NSACF, an update response message indicating whether the number of the at least one UE with the at least one PDU session or PDN connection established on the network slice reaches a maximum number of UEs with the at least one PDU session or PDN connection for the network slice.

2. The method of claim 1, wherein the update request message includes single-network slice selection assistance information (S-NSSAI), an identifier of a UE, and an update flag, and wherein the update flag indicates whether to increase or decrease the number of the at least one UE with the at least one PDU session or PDN connection established on the network slice.

3. The method of claim 2, wherein the number of the at least one UE with the at least one PDU session or PDN connection established on the network slice is increased:

the update flag indicates to increase the number of the at least one UE, the identifier of the UE is not included in a list of UEs associated with the S-NSSAI, and the number of the at least one UE is less than the maximum number of UEs.

4. The method of claim 1, further comprising:

transmitting, to a network repository function (NRF), a network function discovery request message for the NSACF; and receiving, from the NRF, a network function discovery response message including a network function profile of the NSACF, wherein the network function discovery request message includes an NSACF service capability indicator to support monitoring and controlling the number of at least one UE with the at least one PDU session or PDN connection established on the network slice.

5. A method performed by a network slice admission control function (NSACF) in a wireless communication system, the method comprising:

receiving, from a network entity, an update request message for a number of at least one user equipment (UE) with at least one packet data unit (PDU) session or packet data network (PDN) connection established on a network slice, when a UE establishes a first PDU session or a first PDN connection associated with the network slice, or a last PDU session or a last PDN connection associated with the network slice is released; and in response to receiving the update request message from the network entity, transmitting, to the network entity, an update response message indicating whether the number of the at least one UE with the at least one PDU session or PDN connection established on the network slice reaches a maximum number of UEs with the at least one PDU session or PDN connection for the network slice.

6. The method of claim 5, wherein the update request message includes single-network slice selection assistance information (S-NSSAI), an identifier of a UE, and an update flag, and wherein the update flag indicates whether to increase or decrease the number of the at least one UE with the at least one PDU session or PDN connection established on the network slice.

7. The method of claim 6, further comprising:

increasing the number of the at least one UE with the at least one PDU session or PDN connection established on the network slice if:

the update flag indicates to increase the number of the at least one UE, the identifier of the UE is not included in a list of UEs associated with the S-NSSAI, and the number of the at least one UE is less than the maximum number of UEs.

8. The method of claim 5, further comprising:

transmitting, to a network repository function (NRF) entity, a network function register request message; and receiving, from the NRF, a network function response message, wherein the network function register message includes an NSACF service capability indicator to support monitoring and controlling the number of at least one UE with the at least one PDU session or PDN connection established on the network slice.

9. A network entity in a wireless communication system, the network entity comprising:

a transceiver; and at least one processor coupled to the transceiver and configured to:

trigger an update for a number of at least one user equipment (UE) with at least one packet data unit (PDU) session or packet data network (PDN) connection established on a network slice, when a UE establishes a first PDU session or a first PDN connection associated with the network slice, or a last PDU session or a last PDN connection associated with the network slice is released, transmit, to a network slice admission control function (NSACF) entity, an update request message for the number of the at least one UE with the at least one PDU session or PDN connection established on the network slice, and receive, from the NSACF entity, an update response message indicating whether the number of the at least one UE with the at least one PDU session or PDN connection established on the network slice reaches a maximum number of UEs with the at least one PDU session or PDN connection for the network slice.

10. The network entity of claim 9, wherein the update request message includes single-network slice selection assistance information (S-NSSAI), an identifier of a UE, and an update flag, and wherein the update flag indicates whether to increase or decrease the number of the at least one UE with the at least one PDU session or PDN connection established on the network slice.

11. The network entity of claim 10, wherein the number of the at least one UE with the at least one PDU session or PDN connection established on the network slice is increased if:

the update flag indicates to increase the number of the at least one UE, the identifier of the UE is not included in a list of UEs associated with the S-NSSAI, and the number of the at least one UE is less than the maximum number of UEs.

12. The network entity of claim 9, wherein the at least one processor is further configured to:

transmit, to a network repository function (NRF) entity, a network function discovery request message for the NSACF entity, and receive, from the NRF entity, a network function discovery response message including a network function profile of the NSACF entity, wherein the network function discovery request message includes an NSACF service capability indicator to support monitoring and controlling the number of at least one UE with the at least one PDU session or PDN connection established on the network slice.

13. A network slice admission control function (NSACF) entity in a wireless communication system, the NSACF entity comprising:

a transceiver; and at least one processor coupled to the transceiver and configured to:

receive, from a network entity, an update request message for a number of at least one user equipment (UE) with at least one packet data unit (PDU) session or packet data network (PDN) connection established on a network slice, when a UE establishes a first PDU session or a first PDN connection associated with the network slice, or a last PDU session or a last PDN connection associated with the network slice is released, and in response to receiving the update request message from the network entity, transmit, to the network entity, an update response message indicating whether the number of the at least one UE with the at least one PDU session or PDN connection established on the network slice reaches a maximum number of UEs with the at least one PDU session or PDN connection for the network slice.

14. The NSACF entity of claim 13, wherein the update request message includes single-network slice selection assistance information (S-NSSAI), an identifier of a UE, and an update flag, and wherein the update flag indicates whether to increase or decrease the number of the at least one UE with the at least one PDU session or PDN connection established on the network slice.

15. The NSACF entity of claim 14, wherein the at least one processor is further configured to increase the number of the at least one UE with the at least one PDU session or PDN connection established on the network slice if:

the update flag indicates to increase the number of the at least one UE, the identifier of the UE is not included in a list of UEs associated with the S-NSSAI, and the number of the at least one UE is less than the maximum number of UEs.

16. The NSACF entity of claim 13, wherein the at least one processor is further configured to:

transmit, to a network repository function (NRF) entity, a network function register request message, and receive, from the NRF entity, a network function response message, wherein the network function register message includes an NSACF service capability indicator to support monitoring and controlling the number of at least one UE with the at least one PDU session or PDN connection established on the network slice.

* * * * *